Nov. 21, 1944.  H. R. ELLINWOOD  2,363,235
CONTROL VALVE
Filed Jan. 25, 1941  4 Sheets-Sheet 1

Inventor
Herman Ray Ellinwood
By R. S. Berry
Attorney

Nov. 21, 1944.  H. R. ELLINWOOD  2,363,235

CONTROL VALVE

Filed Jan. 25, 1941  4 Sheets-Sheet 2

Inventor
Herman Ray Ellinwood
By R. S. Berry
Attorney

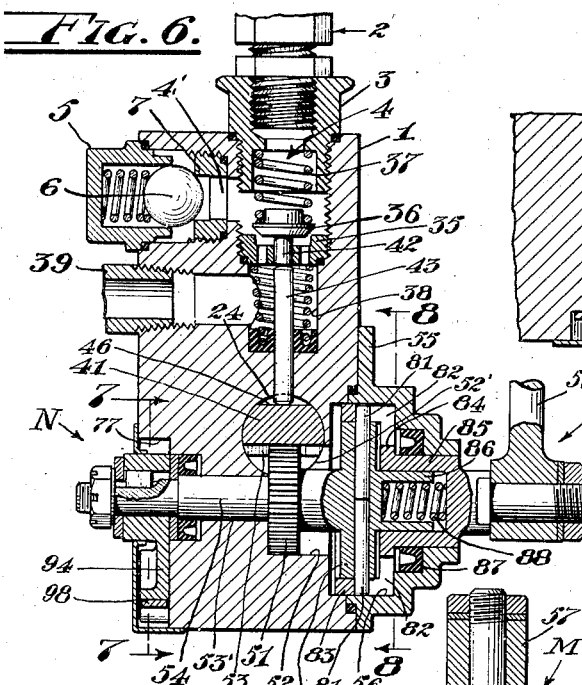
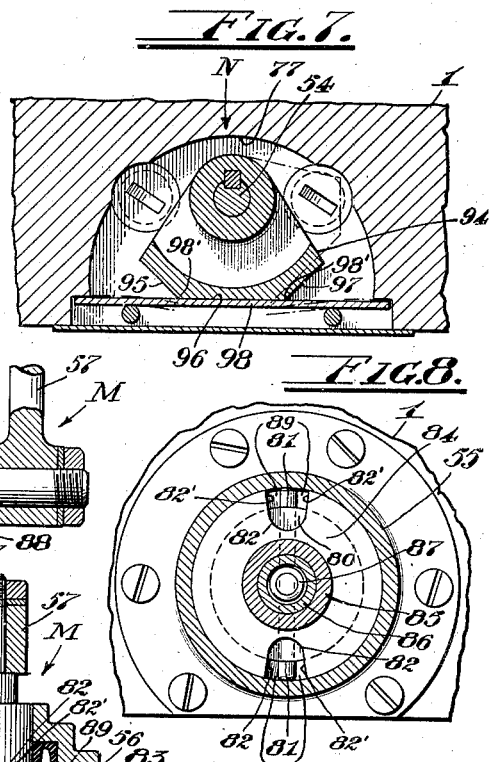
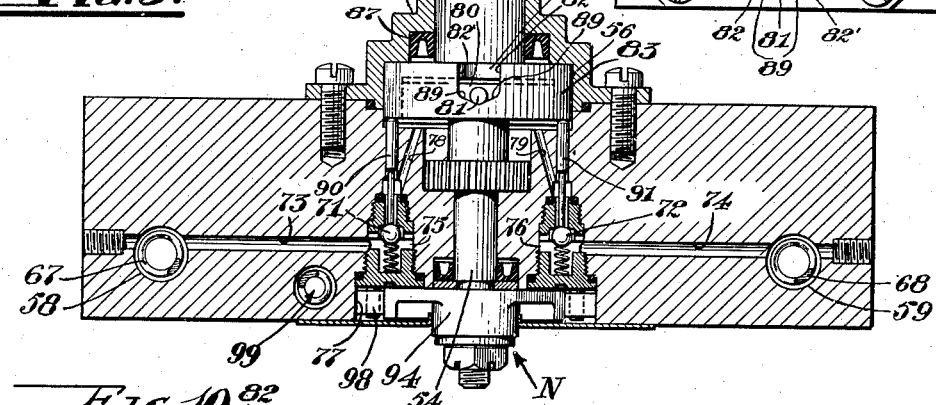
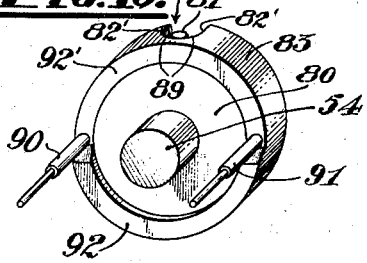

Nov. 21, 1944.   H. R. ELLINWOOD   2,363,235
CONTROL VALVE
Filed Jan. 25, 1941   4 Sheets-Sheet 4
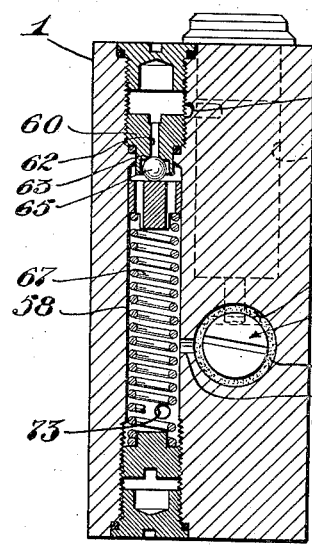
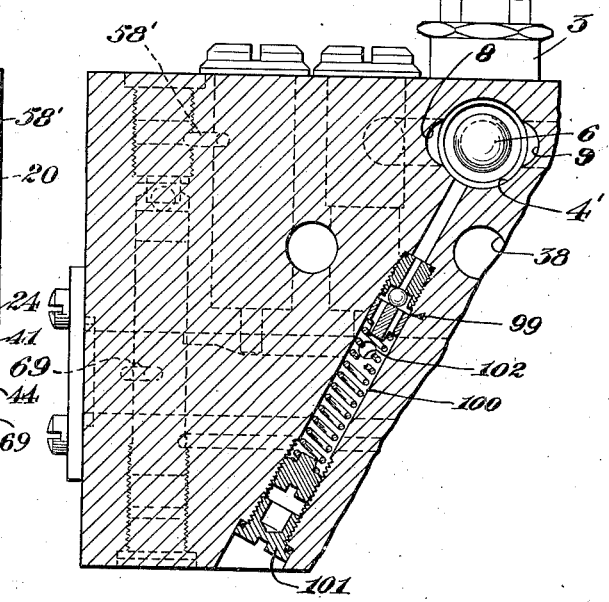
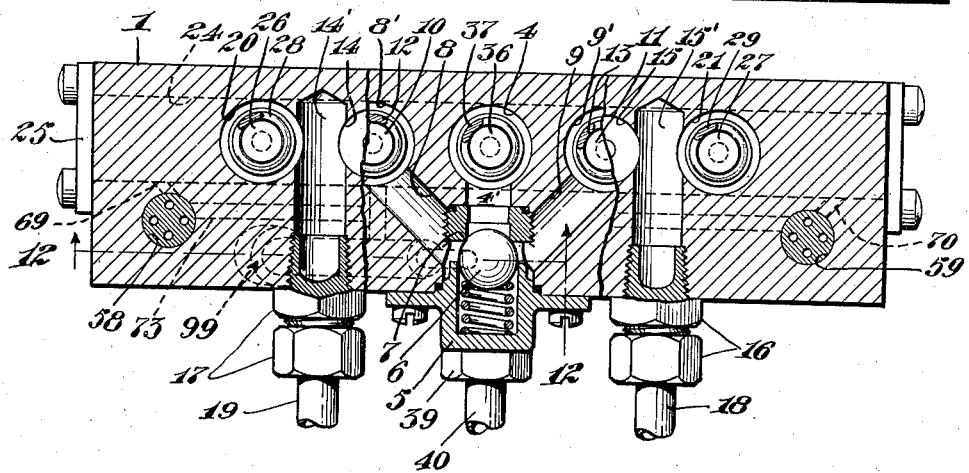
Inventor
Herman Ray Ellinwood
By R. S. Berry
Attorney Patented Nov. 21, 1944

2,363,235

UNITED STATES PATENT OFFICE 2,363,235

CONTROL VALVE

Herman Ray Ellinwood, Burbank, Calif., assignor to Adel Precision Products Corp., Burbank, Calif., a corporation of California Application January 25, 1941, Serial No. 375,943

9 Claims. (Cl. 60—52)

My invention has for its primary object the provision of a new and efficient valve which is especially designed for controlling the operation of hydraulic jacks or like actuators for the landing gear, landing flaps, brakes, cowl flaps, bomb doors, gun turrets, and other fluid actuated or controlled devices of an airplane, in that it is characterized by extreme compactness and small size, minimum weight, simplicity of design, symmetry, balance and reliability of performance.

An important object of my invention is to provide a valve which will permit of selective movement in either direction of the fluid operated pistor or plunger of a hydraulic jack under precise control of the operator, and automatically return to a neutral or predetermined position following a predetermined movement of the piston, and cause said piston to become fluid locked and thereby held in the position gained until the next operation of the valve whereby to afford a greater nicety of control and selectivity of operation of the piston with a minimum of manual actuation of and attention to the valve.

Another object of my invention is to provide a hydraulic control valve of the character described wherein a plurality of valve members may be selectively actuated by means of a manually movable cam shaft which is also subject to operation as a fluid driven piston for the purpose of restoring the valve assembly to a neutral or predetermined position, the cam shaft "piston" being also manually movable to effect the return of the valve to neutral, whereby the full operation of the valve may be manual or part of the operation manual and the remainder automatic to thereby attain the desired nicety of control, selectivity of operation and readiness for selective operation following each predetermined operation of the valve.

The importance of the return to neutral provision of my improved valve will be apparent when it is understood that modern airplanes, particularly the military type, sometimes employ ten or more hydraulic jacks or similar devices each controlled by a valve. In certain operations of a modern airplane it becomes necessary for the operators to manipulate in a short period of time a plurality of the control valves either substantially simultaneously or in rapid sequence, hence the automatic return to neutral function achieved by my valve makes it unnecessary for the operators to manually return the valves to neutral position and therefore the desired control of the plane may be effected with a saving in time and manual effort, and a minimum of attention to operation, as well as with a proper coordination of the airplane control elements which respond to actuation of said valves. For example, to set the landing gear, the operator moves the handle of the appropriate valve a predetermined extent as indicated, and may immediately release the handle inasmuch as the landing gear jack then completes its operation and the handle and valve will return to neutral automatically when the landing gear is set. Having once moved the handle to a predetermined position, the operator is free to immediately operate another valve, for example, for the landing flaps, and another, and so on in like manner, so that in a shorter period of time than heretofore and with less manipulation the desired hydraulically operated and controlled elements of the plane may be operated and controlled in such sequence and manner as to insure the best possible manipulation and control of the airplane and its component parts and accessories.

A further purpose of my invention is to provide a control valve such as described in which a simply constructed and easily machined body member made of standard bar stock is provided for containing a plurality of valves of simple form and arrangement subject to ready installation and removal. These valves are also subject to selective operation by means of a novel cam shaft, likewise of simple form and adapted to be made with a minimum of machining and tooling. Thus it is seen that the valve assembly may be inexpensively and quickly produced in quantities and in an extremely compact form, light as to weight and reliable in performance.

Yet another purpose of my invention is to provide in a control valve a novel and efficient operating mechanism for selectively manually controlling the operation of the plurality of valves in the assembly and the cam-shaft-piston whereby the latter will also respond automatically to fluid pressure and return the control valves to neutral following a predetermined operation thereof.

An additional object of my invention is to provide a control valve wherein a novel arrangement of simple bores in a body block, with single valves and control members in each of certain of said bores and other of the bores serving as passages, makes possible an efficient and compact hydraulic control having, for example, in the body block two high pressure valves controlling the high pressure fluid to opposite ends of the piston of a hydraulic jack, two low pressure valves controlling the return of fluid from the actuator cylinder to the pump reservoir, a high pressure by-pass valve permitting a series hook-up of two more selectively operable valve assemblies of my invention in the one circuit with one pump, a high pressure fluid lock-out check valve for maintaining the high pressure fluid in the actuator cylinder, two cam shaft operating valves for permitting flow of high pressure fluid to opposite ends of the cam-shaft-piston automatically when the jack piston reaches the ends of its strokes, whereby to return the valves to neutral position and open the high pressure by-pass valve; two check valves controlled by means of a manually operated device for shifting the cam-shaft-piston and operating to relieve the low pressure fluid to the pump reservoir from opposite ends of the cam-shaft-piston unit, and a thermal expansion relief valve for relieving fluid from the valve assembly to the pump reservoir, when the fluid attains an excessive pressure from overheating.

With the foregoing objects in view, together with such other objects and advantages as may subsequently appear, the invention is carried into effect as illustrated by way of example in the accompanying drawings, in which:

Fig. 6 is a cross sectional view on the line 6—6 of Fig. 4;

Fig. 7 is a fragmentary sectional view taken on the line 7—7 of Fig. 6;

Fig. 8 is a fragmentary sectional view taken on the line 8—8 of Fig. 6;

Fig. 9 is a horizontal sectional view taken on the line 9—9 of Fig. 5;

Fig. 10 is a perspective view of a part of the manually operable control means for the valve;

Fig. 11 is a sectional view on the line 11—11 of Fig. 4, showing one of the relief valves;

Fig. 12 is a sectional view taken on the line 12—12 of Fig. 13 showing the thermal relief valve;

Fig. 13 is a horizontal sectional view taken on the line 13—13 of Fig. 5.

Figure 1:
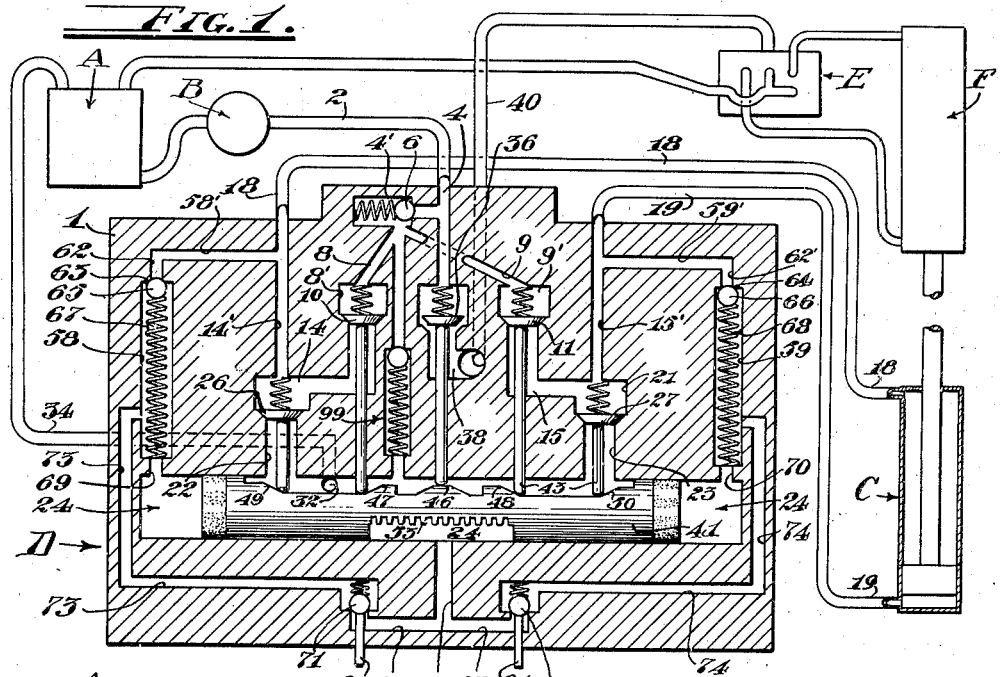
Fig. 1 is a diagrammatic view of the valve and a hydraulic jack system as when the valve is in neutral position.
Figure 2:
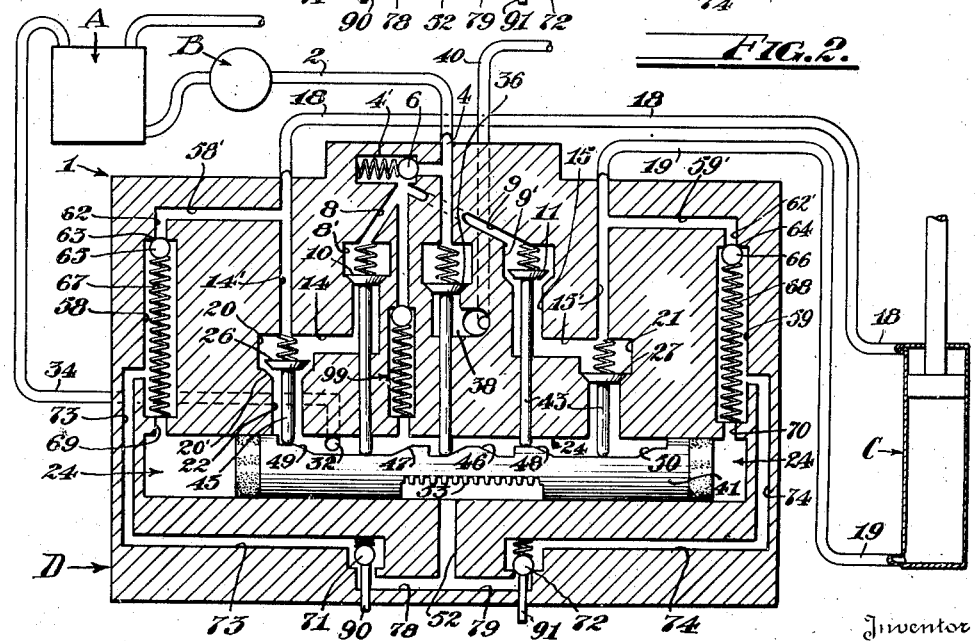
Fig. 2 is a diagrammatic view similar to Fig. 1 with the valve in one of its operative positions in which the piston of the jack is moved in one direction.

Referring now more specifically to the accompanying drawings, and particularly to Figs. 1 and 2, which show diagrammatically one embodiment of my valve as when employed for controlling the operation of a hydraulic jack, A designates a fluid reservoir, B a hydraulic pump connected with the reservoir, C a hydraulic jack such as may be employed for operating the landing gear, brakes, bomb doors, gun turrets, landing flaps, and other parts and accessories of an airplane, and D a valve embodying my invention and connected with the reservoir, pump and jack whereby the piston or plunger of the jack may be selectively extended and retracted as desired under control of said valve. Figs. 1 and 2 also show how a series hook-up of several valves may be effected, there being shown a second valve E coupled with valve D and adapted to control another jack F which may be operated by pressure fluid from the pump B, said two valves as here shown being constructed so that when one is operated the other is automatically cut out of the system and vice versa, whereby each will respond to operation at any time except when one thereof is being operated.

The valve D here shown includes a small compact and generally rectangular body 1 which may be conveniently made from suitable bar stock and easily tooled to provide the necessary passages, ports and spaces for accommodating the valves and other components of the valve assembly.

Figures 3, 4:
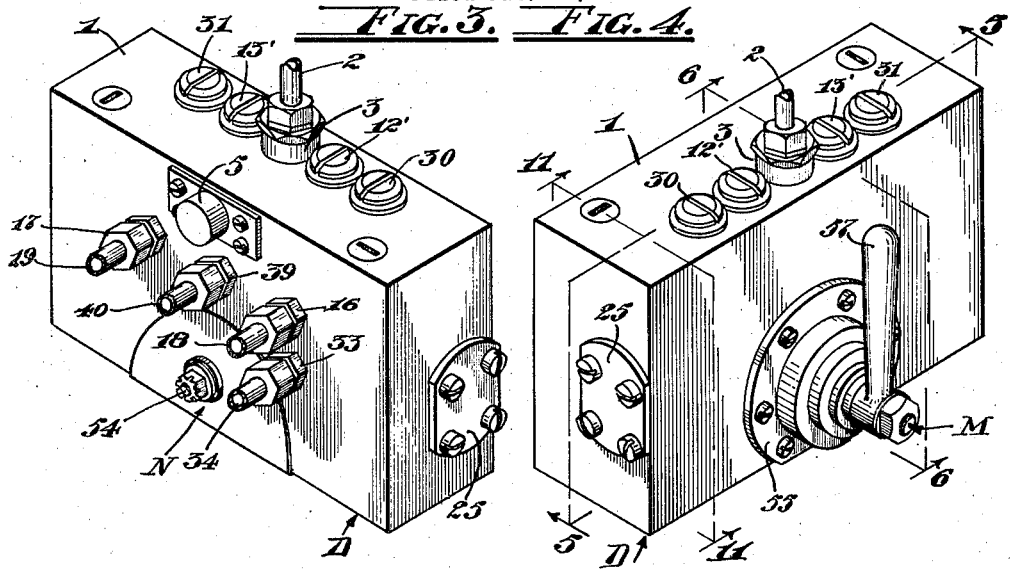
Fig. 3 is a perspective view of my improved valve looking toward the rear face thereof.
Fig. 4 is a perspective view looking toward the front face of the valve.

The valve is constructed as best shown in Figs. 3, 4, and 6 to receive the high pressure fluid from the pump B, as by means of a high pressure line 2 connected by means of a fitting 3 to a high pressure intake passage 4. Passage 4 leads downwardly from the approximate center of the upper side of the body 1, a short distance and then extends laterally as at 4' (see Fig. 6) through one face of the body, said passages being formed by two simple right angular intersecting bores which are typical of the port and passage arrangement throughout my valve. The outer end of the passage 4' is closed by means of a removable flanged cup 5 (see Figs. 6 and 13) in which a spring loaded fluid locking ball check valve 6 is socketed so as to normally engage a seat 7. Check valve 6 opens responsive to high pressure fluid in the passages 4 and 4' and closes when the high pressure fluid is by-passed as shown in Fig. 1 and as will be more fully explained hereinafter.

High pressure passages 8 and 9 lead from points of communication with opposite sides of the branch intake passage 4' beyond the valve seat 7 as shown in Fig. 13, to valve chambers or passages 8' and 9'. Spring loaded high pressure valves 10 and 11 mounted in chambers 8' and 9' are urged toward their seats 10' and 11' in the lower ends of said chambers by means of their springs 12 and 13 and the fluid (see Fig. 5). The chambers 8' and 9' are formed as straight bores (see Fig. 5) leading from the top of the body and closed at their upper ends by means of removable plugs 12' and 13' in which the springs 12 and 13 are socketed.

Figure 5:
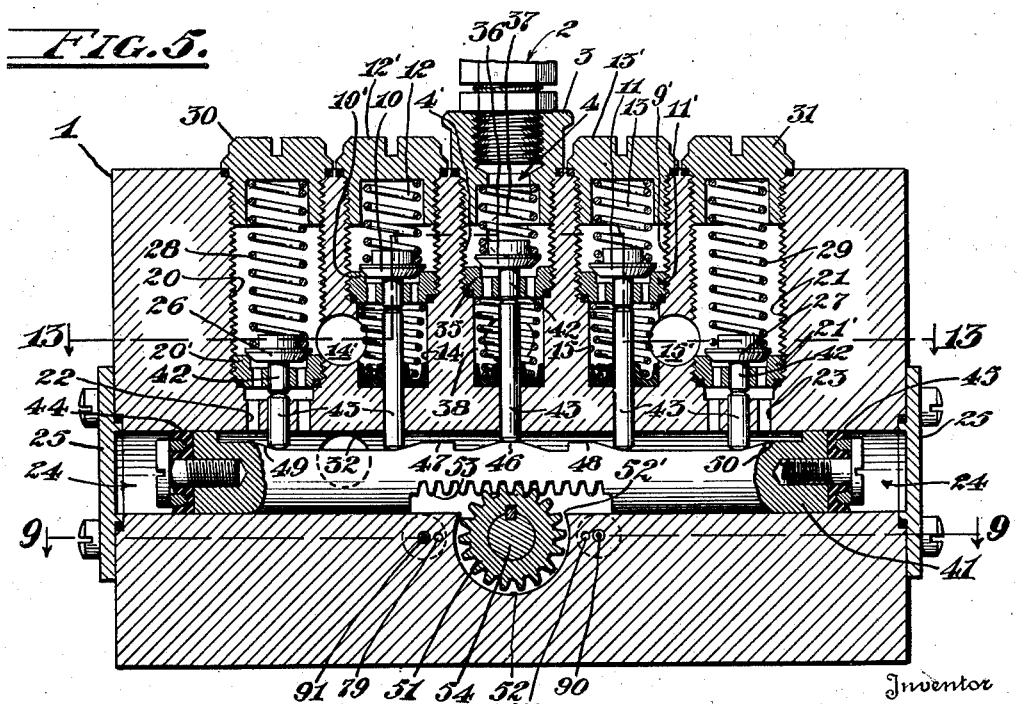
Fig. 5 is a vertical sectional view on the line 5—5 of Fig. 4.

Jack operating passages 14 and 15 extend downwardly from beneath the seats 10' and 11' and then laterally as at 14' and 15' through one face of the valve as best shown in Figs. 5 and 13. At their outer ends the passages 14' and 15 are provided with fittings 16 and 17 for connection with opposite ends of the cylinder of the jack C as by means of the lines 18 and 19 (Figs. 1, 2, 3, and 13). Lines 18 and 19 and the branches 14' and 15' serve to conduct high pressure fluid to and also return low pressure fluid from the jack. The low pressure fluid returns into passages 20 and 21 formed adjacent the passages 14 and 15 and their contiguous chambers 8' and 9' as seen in Fig. 5, the portions or branches 14' and 15' communicating alike with return passages 20 and 21 and passages 14 and 15, due to the intersection of the bores which form the passages 14, 15, 14', 15', 20 and 21.

Fluid returned to the passages 20 and 21 will pass through valve seats 20' and 21' in the lower ends of said passages, and through ports 22 and 23 into a cam shaft passage 24 which extends longitudinally through the valve body 1 (Fig. 5) as a straight bore closed at its ends by means of removable heads 25 and serves as a cylinder.

Low pressure or return valves 26 and 27 in the return passages 20 and 21 are urged against the seats 20' and 21' by means of springs 28 and 29 socketed in removable plugs 30 and 31 which close the upper ends of the return passages. These plugs as well as plugs 12' and 13' and cup 5 provide for ready removal and replacement of the valves, seats, spring, etc. associated with said plugs and cup.

Fluid returned to the cam shaft passage 24 as aforesaid passes out through a passage 32 having a fitting 33 at its outer end providing for connection with a return line 34 leading back to the reservoir A.

In the lower part of the high pressure intake passage 4 is an annular valve seat 35 for a high pressure by-pass valve 36 which is urged against said seat by means of a spring 37 socketed in the fitting 3. A by-pass passage 38 leads from the lower end of the high pressure intake passage at a point below the valve seat 35 and is provided at its outer end with a fitting 39 by means of which a by-pass line 40 may conduct operating fluid to the valve E for operating jack F. When by-pass valve 36 is closed the high pressure fluid opens the check valve 6 and passes into valve D whereby jack C may be operated. When the by-pass valve 38 is opened, high pressure fluid from the intake passage 4 flows into by-pass passage 38 and out through line 40 to valve E. As the opening of this by-pass valve reduces the pressure of the operating fluid, the spring loaded check valve 6 closes and thereby shuts off the flow of operating fluid to valve D. Valve 6 also serves to create a fluid lock for the piston in the jack C so that said piston will be maintained in a predetermined position.

The high pressure valves 10 and 11, the low pressure or fluid return valves 26 and 27 and the by-pass valve 36 are adapted to be operated and controlled by means of a cam shaft 41 mounted in the cylinder passage 24 in the body 1 as shown in Figs. 5, 1 and 2. In the present embodiment this cam shaft is reciprocable and is adapted to be both manually and automatically shifted for actuating said valves. Each of valves 10, 11, 26, 27 and 36 is of the same construction and includes a short pilot stem 42 slidably supported on and extending below the valve seat therefor. Pusher rods 43 are slidably supported on the body 1 for actuation by means of the cam shaft 41 to engage said valve stems.

At its ends the cam shaft is provided with piston packing means 44 and 45 whereby the shaft will operate as a piston responsive to hydraulic pressure against its ends. Between its ends the cam shaft is reduced to provide a space in the passage 24 whereby the fluid return ports 22 and 23 may communicate with the outlet passage 32 which latter opens to said space.

Approximately centrally of the ends of the cam shaft is a cam portion 46 for effecting the opening and closing of the by-pass valve 36 through the push rod 43 and stem 42 thereof. On opposite sides of the cam portion 46 the cam shaft is provided with cam portions 47 and 48 for actuating the push rods 43 and stems 42 associated with the high pressure valves 10 and 11 respectively, and adjacent the ends of said cam shaft are cam portions 49 and 50 for actuating the push rods and stems to effect the operation of the return or low pressure valves 26 and 27 respectively.

When the cam shaft is in neutral position the push rod 43 for the by-pass valve 36 rests on the high dwell point of the cam portion 46, thereby holding said valve open, whereas the push rods 43 for the two high pressure valves 10 and 11 and the two low pressure valves 26 and 27 are spaced from contact with their respective cam portions 47 and 48 and 49 and 50, so that said high pressure and low pressure valves are closed. This neutral condition of the control valves causes the operating fluid from the pump to by-pass through open valve 36 to another valve such as the one E shown in Fig. 1, or as is obvious, back to the pump reservoir.

When it is desired to extend the jack plunger, the cam shaft is shifted from neutral position to the right of position shown in Fig. 1 and assumes the position shown in Fig. 2 in which cam portion 48 has engaged and actuated the push rod 43 for opening and holding open the high pressure valve 11 and cam portion 49 has engaged and actuated the push rod 43 for opening and holding open the low pressure or return valve 26. All other cam shaft controlled valves are closed and the jack plunger will be extended as will be hereinafter more fully described.

Movement of the cam shaft to the left of neutral position will bring about opening of high pressure valve 10 and low pressure valve 27 and the closing of valves 11, 26 and 36 whereby to retract the jack plunger.

To provide for operating the cam shaft 41 a means M as here shown including a pinion 51 is mounted in a recess or bore 52 formed in the body 1 so as to intersect the cam shaft passage 24 (Fig. 6) and form an opening 52' whereby the pinion may be meshed with rack teeth 53 on the cam shaft. A rotary shaft 54 is journalled in a counterbore 53' of the recess or bore 52 and drives the pinion 51. This rotary shaft extends out through a cover or closure cap 55 removably fitted on the outer face of the body so as to form with said recess 52 a fluid tight chamber 56 for a purpose to be hereinafter described. The outer end of the shaft is equipped with a suitable handle 57 by means of which the shaft may be rotated in either direction for driving the pinion 51 and thereby shifting the cam shaft 41.

I have found that it is desirable for reasons hereinbefore pointed out to effect an automatic return to neutral of the cam shaft controlled valves and therefore provide for automatically shifting the cam shaft for such purpose when the jack plunger reaches predetermined positions. This return to neutral provision also makes possible an automatic fluid locking action of the jack plunger so that it will be maintained in the desired position by means of the fluid trapped in the ends of the jack cylinder coincident with the aforesaid return to neutral operation.

For the purpose of automatically returning the valves to neutral, cam shaft operating passages 58 and 59 are formed in the body to extend parallel with and spaced laterally from the return passages 20 and 21 and are communicated with said return passage through ports 58' and 59' at points above the return valves 26 and 27 as shown in Figs. 11 and 12. The passages 58 and 59 are closed at their upper ends by means of plugs 60 and 61 having ports 62 and 62' therein in communication at their ends with the ports 58' and 59' and the passages 58 and 59 respectively.

At their lower ends the plugs 60 and 61 have seats 63 and 64 for ball check valves 65 and 66 which are urged into closed position by spring means 67 and 68. Valves 65 and 66 are tensioned to open at the increased pressure attained at the ends of the strokes of the jack plunger. The portions of the passages 58 and 59 below the check valves 65 and 66 are communicated with the ends of cam shaft passage 24 by means of passages 69 and 70, best shown in Fig. 11. As a result of this arrangement of the passages 58 and 59 and associated passages, it is seen with reference to Fig. 2, that when return or low pressure valve 27 is closed and high pressure fluid flows past open valve 11 and to the jack for extending the jack plunger, the high pressure fluid is also present in the portion of low pressure passage 21 above the valve 27 therein and therefore is effective through the ports 59' and 62' to open the check valves 66 responsive to a pressure build-up or increase which will occur when the jack plunger reaches the end of its stroke. Thus it is seen that check valves 65 and 66 controlling the operation of the cam shaft as a piston are automatically opened when the plunger of the jack reaches the ends of its strokes and the pressure builds up in the system as aforesaid. When check valve 66 is opened the operating pressure fluid is effective through passages 59 and 70 to reach the right end of the cam shaft as shown in Fig. 2 and the cam shaft will then move to the left and operate the valves to return them to neutral position shown in Fig. 1.

Before the cam shaft 41 can be operated it is necessary that the fluid at least at one end thereof be relieved and this is accomplished as here shown by means of two spring loaded ball check valves 71 and 72 controlled by the operating means M as will now be described.

As shown in Fig. 9 low pressure return passages 73 and 74 lead from the lower ends of passages 58 and 59 to bores 75 and 76 formed in the body 1 adjacent and on opposite sides of the shaft 54. Bores 75 and 76 open to a recess 77 formed in an adjacent face of the body 1, through which recess spring loaded check valves 71 and 72 are inserted into position for operation in said bores. Passages 78 and 79 lead from the inner ends of bores 75 and 76 to the recess 52. As the recess 52 is communicated by means of the opening 52' with that part of the cam shaft cylinder or passage 24 which is between the ends of the shaft and in communication with the fluid return passages 32 and line 34 leading to the reservoir A, it is seen that when one of the check valves 71 and 72, for example, valve 71, is opened fluid will flow from the left end of the cylinder as seen in Fig. 2 through passage 69 into the passage 58 and from thence through passage 73, open check valve 71, passage 78, recess 52, and opening 52' into cam shaft passage 24 and out through return passage 32 and line 34 to reservoir A. This will vent the passage 24 so that the cam shaft may be moved to the left from position shown in Fig. 2 into neutral position shown in Figs. 1 and 5.

As shown in Fig. 6 a circular disk 80 is fixed to the shaft 54 for rotation in the chamber 56 and carries peripheral drive pins 81 engaging in cam notches 82 in a cam and drive ring 83 connected by means of web 84 with a drive sleeve 85. The sleeve 85 has the handle 57 fixed thereto and telescopes the tubular outer end portion 86 of the shaft 54. A packing ring 87 surrounds the sleeve 85 where it extends through the closure cap 55 to provide a fluid tight seal. A helical spring 88 is mounted on the tubular end portion 86 of shaft 54 and abuts the corresponding ends of the sleeve 85 and end portion 86 to permit of axial yielding of the sleeve 85 and ring 83 as well as to effect a slight turning thereof as will be hereinafter described.

The notches 82 are of such width that the drive pins 81 which are normally seated in the center of V-shaped cam surfaces 89 at the inner ends of the notches in spaced relation to the side edges 82' thereof, will not be drivingly engaged with said edges until the handle 57 has turned the sleeve sufficiently, say about seven degrees of arc, to effect a cam action between the drive pins 81 and the cam surfaces 89. This cam action takes place as the cam surfaces 89 move relative to the drive pins 81 with the initial movement of the handle 57, and results in the sleeve 85 and ring 83 being forced axially inward while the sleeve is also turned said predetermined extent. This inward movement of the cam ring causes pusher rods 90 and 91 (see Fig. 10) bearing against said ring to be extended and open the check valves 71 and 72 simultaneously. This opening of check valves 71 and 72 relieves the fluid in cylinder 24 and permits of full manual shifting of the cam shaft 41 in either direction and also back to neutral, if manual return to neutral is desired.

The initial turning of the handle 57, sleeve 85 and ring 83 which effects the cam action and results in the opening of both check valve 71 and 72, also disposes an arcuate cam segment 92 carried by said ring, so that one of the pusher rods will ride on said cam segment while the other is clear thereof and although both pusher rods are extended sufficiently to open the check valves 71 and 72 by the action of the cam surfaces 89, said rods will remain one on and one off the cam segment 92 until the cam shaft 41, shaft 54, handle 57, and associated parts are returned to neutral.

When the handle 57 is moved in either direction past the point where the two check valves 71 and 72 open, or in other words about seven degrees of arc, the drive pins 81 engage certain of the side edges 82' of notches 82 and thereby provide for turning the disk 80 and shaft 54 so that drive pinion 51 through rack teeth 53 will shift the cam shaft 41, for example, from position shown in Fig. 1 to position shown in Fig. 2 whereby to extend the piston of the jack C. During the rotation of shaft 54 to effect an operation of the jack, the cam segment 92 on the drive ring 83 is disposed so that the one of the pusher rods 90 and 91 which rests on said segment will be spaced a greater distance from the ends of said segment, or in other words, from the flat portion 92' of the ring 83 on which portion the other pusher rod is engaged. This setting of said pusher rod further inward on the cam segment is important because when the handle 57 is released following its movement to a position for opening the valves of the assembly for actuating the jack as desired, the spring 88 then under tension exerts an outward push on the ring 83 whereby the cam surfaces 89 are urged against drive pins 81 and cause the ring 83, sleeve 85, and handle 57 to move toward neutral position the same extent as originally moved to simultaneously open valves 71 and 72, while at the same time moving the ring 83 and sleeve 85 axially outward sufficient to release the pusher rods 90 and 91 and allow valves 71 and 72 to close. However, it is desired to maintain one pusher rod in position to open its associated valve and the other in position to allow its associated valve to close and it will be noted that while the cam ring 83 centers itself on the pins 81 as aforesaid when the handle 57 is released before being returned to neutral, this does not effect any return movement of the cam shaft 41, shaft 54, disk 80 and pins 81, which therefore will remain in the position in which they were manually moved until either manually or hydraulically returned to neutral. It is therefore seen that movement of the cam segment 92 through the action of cam surfaces 89 and pins 81, (approximately seven degrees of arc) will not move the cam segment 92 on the ring out of position clearing the one of the two pusher rods 90 and 91 which was initially disposed on said segment with the initial (seven degrees) movement of the handle 57 and ring 83, and said one pusher rod will maintain its associated one of the two check valves 71 and 72 open to relieve the fluid from the end of the passage 24 toward which end the cam shaft 41 must be moved to return to neutral position under hydraulic pressure.

The retention of the cam shaft 41 and its associated manually operable means in its operative and neutral positions is assured by means of detent mechanism N disposed in the recess 77. This detent mechanism includes a cam member 94 (Figs. 6, 7 and 9) keyed on the shaft 54 and having angularly related flat and contiguous surfaces 95, 96 and 97 adapted to bear upon a leaf spring 98. Spring 98 is secured in the recess 77 so that it is in tensioned contact with the cam member 94 as best shown in Fig. 7. The flat surface 95 is in contact with spring 98 when the valve mechanism hereof is set to extend the plunger of the jack and surface 97 is in contact with the spring when the valve mechanism is set to retract the jack plunger, whereas the central flat surface 96 contacts the spring when the valve mechanism is in neutral position. These flat surfaces bearing on the spring 98 prevent unintentional movement of the valve mechanism out of predetermined position. However, the detent means will readily yield to manual effort applied through the operating mechanism M and when the cam shaft is hydraulically actuated. Moreover this detent means will serve as an actuator to assist the return of the cam shaft to neutral position, inasmuch as the action of the spring 98 against the corners 98' between the flat surfaces 95, 96 and 97 of the cam 94 will produce a leverage sufficient to turn the shaft 54 and shift the cam shaft.

A spring loaded thermal expansion relief valve 99 is seated in a passage 100 therefor in the body 1. One end of passage 100 opens into high pressure intake passage 4' as shown in Figs. 12 and 13 beyond valve 6 and adjacent the juncture of passages 8, 9 and 4'. A plug 101 closes the other end of the passage 100. A vent passage 102 leads from the passage 100 into the central part of cam shaft passage 24 whereby fluid relieved by the valve 99 will return to the reservoir through passage 32 and line 34. The valve 99 is tensioned to open at above pressures required for operating valves 65 and 66 and therefore opens only when excessive heat expansion of the fluid occurs.

Operation

Assuming the system is filled with operating fluid the pump B is in operation, and the valve D is in the neutral position as shown in Fig. 1, when it is desired to extend the plunger of the jack, the operator moves the handle 57 (Figs. 4, 6, and 9) to the right of position thereof shown in Fig. 4 and thereby turns the sleeve 85 clockwise relative to shaft 54 a short distance, say seven degrees of arc, before the shaft commences to turn. During this initial movement of the handle 57 and sleeve 85 the V-shaped cam surface 89 on the ring 83 carried by sleeve 85 is moved relative to the drive pins 81 (Figs. 6, 9 and 10) which latter cannot move due to the fact that all valves controlling the flow of fluid relative to the cam shaft passage 24 are closed and fluid is locked therein so as to prevent movement of the cam shaft 41, pinion 51, shaft 54, disk 80 and pins 81 on said disk. The cam ring 83 in turning as aforesaid will, due to the cam action between pins 81 and cam surface 89, be forced axially inward against the action of the spring 88 and in so moving will extend the push rods 90 and 91 and simultaneously open (see Fig. 9) the check valves 71 and 72. The opening of the valves 71 and 72 releases the fluid lock on the cam shaft and fluid is subject to discharge from both ends of passage 24 through passages 69 and 70, passages 58 and 59, passages 73 and 74, open check valves 71 and 72, passages 78 and 79, opening 52' into "open" portion of passage 24 between the ends of the cam shaft 41, and thence back to reservoir A through the passage 32 and return line 34.

When the valves 71 and 72 are opened simultaneously further movement of the handle 57 to the right causes side edges 82' of the notches 82 in the drive and cam ring 83 to engage drive pins 81 and thereby rotate the disk 80 and shaft 54 in a clockwise direction so that the pinion 51 engaging rack teeth 53 will shift the cam shaft 41 to the right of the position shown in Fig. 1. The flat face 97 of the detent member 94 on shaft 54 will engage spring 98 to stop the manual operation when the cam shaft reaches the position shown in Fig. 2.

The cam shaft 41 in moving to the right from position shown in Fig. 1 to position shown in Fig. 2 disposes the cam portion 46 in position to allow the spring urged by-pass valve 36 to close and at the same time the cam portions 48 and 49 operate to open and hold open the high pressure valve 11 and the low pressure valve 26, the valves 10, 36 and 27 remaining closed.

High pressure fluid from the pump is now effective to extend the plunger of jack C, through high pressure line 2, intake passages 4 and 4' past check valve 6 which has opened responsive to a predetermined working pressure attained when by-pass valve 36 closed; high pressure passage 9, valve chamber 9', open high pressure valve 11, jack operating passages 15 and 15', line 19 to the lower end of the jack as seen in Figs. 1 and 2.

Low pressure fluid from the jack returns to the reservoir A through line 18, passage 14', passage 20, open low pressure valve 26, port 22, cam shaft passage 24, passage 32 and return line 34.

As soon as the operator has moved the cam shaft 41 to the position for extending the jack, the handle 57 may be released and the cam shaft will be maintained in its operating position by the detent means N as hereinbefore explained, the operator having taken but little time to so move the shaft and being then free to give his attention to other valves or controls in the manipulation of airplanes.

When the operator releases the handle 57 the spring 88 urges the ring 83 axially outward, and the cam surfaces 89 bearing on drive pins 81 cause the ring to turn a short distance counter-clockwise (say seven degrees of arc) so that the pins 81 are centered on the cam surface 89 in the position shown in Fig. 9. This small axially outward movement of the ring 83 releases the push rod 91 and allows check valve 72 to close but does not release the push rod 90, which has ridden onto cam segment 92 on the ring 83, and so remains holding valve 71 open until the cam shaft 41 returns to neutral. The check valve 71 must remain open to permit of release of fluid from the left end of passage 24 as necessary in returning the cam shaft to neutral.

If the operator does not manually effect the return of the cam shaft to neutral, it will automatically return to such position and set the main control valves in neutral when the jack plunger reaches the end of its extension stroke and the pressure increases due to immobility of said plunger. When this pressure increase occurs the check valve 66, set to open at slightly higher than normal working pressure, will open and allow the high pressure fluid to pass into the right end of crank shaft passage 24 through passage 59, and passage 70, whereby to force the cam shaft 41 to the left and into neutral position.

Relief of low pressure fluid from the left end of cam shaft passage 24 during the return to neutral movement of the cam shaft takes place through passage 69, passage 58, passage 73, open check valve 71, passage 78, recess 52, opening 52', "open" part of passage 24, located between the ends of the cam shaft, return passage 32 and line 34 to the reservoir B.

As the cam shaft 41 moves back to neutral the rack teeth 53 rotate pinion 51 so that the shaft 54 and handle 57 will be returned to the neutral position shown in Figs. 4, 6, and 9. As the shaft 54 thus returns to neutral the cam segment 92 on the cam ring 83 is returned to position clear of the push rod 90, whereby the check valve 71, due to being spring loaded, will close.

Return of the cam shaft 41 to neutral position brings the cam portion 46 thereon under the push rod 43 for the by-pass valve 36 whereby to open said valve and allow the pressure fluid from the pump to by-pass to valve E as hereinbefore described. As soon as this by-passing operation takes place the pressure in passage 41 is reduced and the spring loaded check valve 6 will close and thereby lock the fluid in the jack cylinder to cause the jack plunger to maintain its extended position. All of the cam shaft controlled valves except by-pass valve 36 are closed as seen in Fig. 1 when the cam shaft 41 is returned to neutral position.

It is not deemed necessary to describe the operation of the valve when manipulated for retracting the jack plunger inasmuch as such an operation will be obvious with reference to the foregoing description and accompanying drawings.

Attention is called to the fact that the control valve unit hereof can be operated to extend and retract the jack plunger various distances short of full extension and full retraction strokes. To accomplish this operation, the valve handle 57 is moved all the way as in effecting a full extension or retraction of the plunger but is returned to neutral position before the pressure has become effective for moving the plunger through its full stroke. This requires careful judgment of the operator and knowledge as to the usual time required per full plunger stroke, inasmuch as when the cam shaft 41 is thus returned to neutral the by-pass valve 36 opens and by-passes the high pressure and this allows the lock out check valve 6 to close and trap the fluid in the jack cylinder whereby to hold the jack plunger in the position short of its full stroke to which it has been moved. By this "cracking" operation of the valve an appreciable nicety of control is afforded and is particularly desirable in operating cowl flaps and other devices on an airplane which are subject to adjustment in this manner.

I claim:

1. In a valve, a body having a plurality of passages adapted for operatively connecting a fluid pump with a fluid actuated device, valve means carried by said body for controlling the flow of fluid therein including reciprocable members for opening and closing valves of said valve means, means for operating said valve means to open certain of said passages for controlling the flow of fluid between the valve and the fluid actuated device, including a reciprocable cam shaft which is operable as a piston in one of said passages for restoring said valve means to a neutral condition closing said certain passages responsive to fluid pressure attained following the opening of said certain passages, said operating means including cam shaft operating passages leading from said certain passages to opposite ends of the passage in which the cam shaft is operable as a piston; normally closed spring loaded check valves operating in said cam shaft operating passages to open responsive to a predetermined fluid pressure attained in said certain passages; fluid return passages in said body leading from opposite ends of the passage in which the cam shaft operates for returning fluid to said pump; return valves for controlling said return passages; and means responsive to movement of said valve operating means for controlling the last named valves.

2. In a valve, a body having a plurality of passages for establishing a fluid circuit between a pump and a fluid actuated device, valve means carried by said body for controlling the flow of fluid in passages therein, means for operating said valve means to open certain of said passages for controlling the flow of fluid to and from the fluid actuated device, including a reciprocable cam shaft in said body initially manually operable for opening said valve means and thereafter operating automatically as a piston for actuating the valve means to close said certain passages responsive to a higher than normal operating pressure attained in said certain passages following a predetermined operation of said device, and means responsive to movement of said means for operating said valve means, for controlling the hydraulic operation of said cam shaft.

3. In a valve, a body having a plurality of passages for establishing a fluid circuit between a pump and fluid actuated device, valve means carried by said body for controlling the flow of fluid in passages therein, means for operating said valve means to open certain of the passages for controlling the flow of fluid to and from the fluid actuated device, including a reciprocable cam shaft in another of said passages and being manually operable for opening said valve means and thereafter operable as a piston, responsive to a predetermined fluid pressure, for actuating the valve means to close said certain passages; said operating means also including cam shaft operating passages in said body leading from the said certain passages to opposite ends of the cam shaft passage, normally closed check valves controlling said cam shaft operating passages and opening responsive to a predetermined fluid pressure attained in said certain passages, return passages in said body leading from opposite ends of said cam shaft passage and adapted for returning fluid to said pump, return valves controlling said return passages, and means for selectively opening and closing said return valves responsive to movement of said valve operating means.

4. In a valve, a body having a plurality of passages for operatively connecting a hydraulic pump with a hydraulic jack, valves carried by said body for controlling the flow of fluid in said passages, means for operating said valves to move them from a neutral position closing those of the passages for controlling the flow of fluid to and from said jack into open position, including a reciprocable cam shaft operable manually to open the valves and thereafter hydraulically operable as a piston in one of said passages for returning said valves to neutral, cam shaft operating passages in said body leading from the passages through which fluid flows for operating the jack to opposite ends of the passage in which the cam shaft is mounted, normally closed cam shaft operating valves controlling said cam shaft operating passages and opening responsive to a predetermined fluid pressure, fluid return passages in said body leading from opposite ends of the passage containing the cam shaft and adapted for returning fluid to said pump, return valves controlling said return passages, and means for opening and closing said return valves responsive to actuation of said valve operating means.

5. In a valve, a body having a plurality of passages including a fluid return passage adapted for operatively connecting a fluid reservoir, a hydraulic pump and a hydraulic jack in a hydraulic circuit, valves carried by said body for controlling the flow of fluid in those of the passages through which fluid passes in flowing to and from the jack, means for operating said valves to move them from a neutral position closing said passages into open position, including a cam shaft in said fluid return passage responsive to a predetermined fluid pressure following said opening of said valves for moving said valves to said neutral position, one of the said passages in the body constituting a high pressure intake adapted for connection with the pump and leading to the passages through which fluid flows for operating the jack, a by-pass passage leading from said intake passage and through which fluid may be by-passed from said valve body for operating another jack or for return to said reservoir, a by-pass valve controlling said by-pass passage and operating responsive to the actuation of said operating means to open when the first named valves are closed and to close when the first named valves are open, and a normally closed check valve arranged in said intake to open responsive to fluid pressure therein when the by-pass valve is closed and to close when the by-pass valve is open.

6. In a hydraulic control valve, a body having a high pressure intake passage adapted to be connected with a hydraulic pump, jack operating passages leading from said intake passage and adapted for connection with a hydraulic jack which is to be controlled by said valve, selectively operable valves mounted in said body for controlling said jack operating passages, a by-pass passage leading from said intake passage and adapted for connection with another hydraulic control valve or with a return line to said pump, a normally closed spring loaded by-pass valve in said by-pass passage, a normally closed spring loaded check valve controlling the communication of said intake passage with said jack operating passages in advance of said selectively operable valves, and arranged to remain closed when the by-pass valve is open and to open responsive to pressure when the by-pass valve is closed, and means for selectively opening and closing said selectively operable valves operating to open said by-pass valve when certain of the selective valves are closed and to permit the by-pass valve to close when certain of said selective valves are opened, including a cam shaft common to said selective and by-pass valves and operated manually to control certain of said valves and responsive to hydraulic pressure to control certain of said valves including the by-pass valve.

7. In a valve for controlling a hydraulic jack or the like, a body member having fluid passages adapted for establishing a fluid operating circuit between a fluid reservoir, a pump and a jack; a plurality of spring loaded valves for controlling said passages, certain of said valves being arranged to open responsive to fluid pressure in certain of said passages, and means for opening and closing the other of said valves including a cam member movable in one of said passages, valve actuating members responsive to movement of said cam member, and means for manually moving said cam member including provision for automatically returning said cam member to a predetermined position upon the opening of one of said pressure responsive valves following a manual movement of said cam member, including return valves for controlling the cam member passage, a handle for manually moving the cam member, and means responsive to movement of the handle for controlling said return valves.

8. In a control valve for a hydraulic jack or the like, a valve body, valves mounted in said body, and cam means in said body for controlling said valves including a passage, a cam member reciprocable in said passage responsive to fluid pressure and manual actuation, a rotary shaft in said body, and drive means between said cam shaft and rotary shaft for reciprocating said cam member, a sleeve relatively rotatably and axially movably mounted on said shaft, an operating handle for rotating said sleeve, check valves for relieving fluid from opposite ends of the passage in which said cam member is reciprocable, a drive ring carried by said sleeve, a disk carried by said shaft, means operating on initial rotation of the sleeve and the drive ring for shifting said ring axially and then effecting a drive connection between the ring and disk for rotating said shaft, push rods responsive to the axial shifting of said ring for opening said check valves, other means responsive to relative rotation of the ring and shaft for actuating the push rods to close one check valve and open the other check valve, and means under control of certain of the first named valves for introducing fluid under pressure to either end of said passage for moving the cam member as a piston.

9. In a control valve for a hydraulic jack or the like, a valve body, valves mounted in said body, means in said body for controlling said valves including a passage, a valve actuating member movable in said passage responsive to fluid pressure and manual actuation, a rotary shaft in said body, and drive means between said member and rotary shaft for reciprocating said member, a sleeve relatively rotatably and axially movably mounted on said shaft, an operating handle for rotating said sleeve, check valves for relieving fluid from opposite ends of the passage in which said member is movable, a drive ring carried by said sleeve, a disk carried by said shaft, means operating on initial rotation of the sleeve and the drive ring for shifting said ring axially and then effecting a drive connection between the ring and disk for rotating said shaft, means responsive to the axial shifting of said ring for opening said check valves, other means responsive to relative rotation of the ring and shaft for actuating the check valve operating means to close one check valve and open the other check valve, and means under control of certain of the first named valves for introducing fluid under pressure to either end of said passage for moving said valve actuating member.

HERMAN RAY ELLINWOOD.